United States Patent [19]

Hall et al.

[11] 3,939,225

[45] Feb. 17, 1976

[54] LENSES FOR EXTERIOR VEHICLE LAMPS

[75] Inventors: William J. Hall, Brimfield; Robert A. Myers, Wilbraham, both of Mass.

[73] Assignee: Monsanto Company, St. Louis, Mo.

[22] Filed: Dec. 19, 1973

[21] Appl. No.: 426,380

[52] U.S. Cl......... 260/880 R; 240/106 R; 240/106.1
[51] Int. Cl.².......................................... C08L 9/06
[58] Field of Search .............. 260/880 R, 85.5 HC; 240/106, 106.1

[56] References Cited
UNITED STATES PATENTS

| | | | |
|---|---|---|---|
| 2,831,394 | 4/1958 | Heenan | 88/57 |
| 2,994,680 | 8/1961 | Hammon | 260/880 R |
| 3,073,798 | 1/1963 | Baer | 260/880 R |
| 3,336,417 | 8/1967 | Sakuma | 260/880 R |
| 3,491,071 | 1/1970 | Lanzo | 260/85.5 HC |
| 3,514,589 | 5/1970 | Huber | 240/46.59 |
| 3,636,138 | 1/1972 | Beer | 260/880 R |
| 3,763,278 | 10/1973 | Griffith | 260/880 R |

*Primary Examiner*—Paul R. Michl

[57] ABSTRACT

The present invention relates to lenses for exterior vehicle lamps wherein the lenses are molded from a high nitrile polymer comprising 55 to 85 percent by weight of a nitrile monomer unit and from 15 to 45 percent by weight of a monovinylidene aromatic monomer.

12 Claims, No Drawings

LENSES FOR EXTERIOR VEHICLE LAMPS

BACKGROUND OF THE INVENTION

1. Field of the Invention

The present invention relates to lenses or lamp coverings for exterior vehicle lamps wherein the lens is molded from a high nitrile polymer comprising from 55 to 85 percent by weight of a nitrile monomer unit and from 15 to 45 percent by weight of a monovinylidene aromatic monomer.

2. Description of the Prior Art

Exterior lamps are widely used in land, sea and air vehicles. Examples of exterior vehicle lamps include the parking lights, tail lights, stop lights, backup lights, running lights, signal lights, etc., which are found in automobiles, boats and aircraft.

Exterior lighting fixtures on vehicles usually comprise a lamp, which is the term used for the light source and supporting structure, and a covering over the lamp which is referred to as a lens. The lens serves as a protective covering over the lamp and may additionally serve to focus or diffuse the light transmitted by the lamp and to transmit light of different colors, e.g., red, amber, green, white, etc. The lenses used for exterior lamps on vehicles must have good optical properties and impact resistance, high heat distortion, good weatherability, and be readily molded into many diverse and sometimes complex shapes.

For some time now polymethylmethacrylate (PMMA) has been widely used to prepare lenses for exterior lamps. However, a need exists in the art for exterior lenses which can be molded faster and which exhibit improved chemical resistance and improved weatherability. The present invention provides such lenses.

SUMMARY OF THE INVENTION

The present invention provides lenses which exhibit excellent optical properties, impact resistance, high heat distortion, weatherability and moldability. These lenses are prepared from a high nitrile polymer containing 55 to 85 percent by weight of nitrile monomer units and from 15 to 45 percent by weight of a monovinylidene aromatic monomer. Lenses prepared in accordance with the present invention exhibit faster molding cycles, improved chemical resistance and improved weatherability than the PMMA lenses of the prior art.

DESCRIPTION OF THE PREFERRED EMBODIMENTS

The exterior lenses of the present invention are molded from a nitrile polymer which contains (1) from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile; and (2) from 15 to 45 percent by weight of a monovinylidene aromatic hydrocarbon monomer which is copolymerizable with the nitrile monomer.

Preferably, the nitrile polymer contains from 60 to 70 percent by weight of nitrile monomers and 30 to 40 percent of a monovinylidene aromatic hydrocarbon such as styrene, alpha-methylstyrene; ring-substituted alkyl styrenes, e.g., vinyl toluene, O-ethylstyrene, p-ethylstyrene, 2,4-dimethylstyrene, etc.; ring-substituted halostyrenes, e.g., o-chlorostyrene, p-chlorostyrene, o-bromostyrene, 2,4-dichlorostyrene, etc.; ring-alkyl, ring-halosubstituted styrenes, e.g., 2-chloro-4-methylstyrene, 2,6-dichloro-4-methylstyrene, etc.; vinyl naphthalene; vinyl antracene, etc. Preferably, the alkyl substituents contain from 1 to 4 carbon atoms, as for example, methyl, ethyl, propyl, isopropyl, butyl and isobutyl. Mixtures of the above monovinylidene aromatic monomers may be employed. Styrene and alpha methylstyrene are preferred.

Up to 10 percent of the monovinylidene aromatic hydrocarbon monomer can be replaced with a vinylidene monomer selected from the group consisting of alkyl vinyl ethers wherein the alkyl group contains from 1 to 4 carbon atoms, such as methyl vinyl ether, ethyl vinyl ether, etc.; vinyl esters such as vinyl acetate and alkyl esters of acrylic and methacrylic acids wherein the alkyl groups contain from 1 to 4 carbon atoms, such as methyl acrylate, methyl methacrylate, butyl acrylate, butyl methacrylate, etc.; lower alpha olefins of from 2 to 4 carbon atoms such as ethylene, propylene butylene and isobutylene; alkyl itaconates wherein the alkyl group contains from 1 to 4 carbon atoms such as methyl itaconate, ethyl itaconate, etc. Up to 100 percent of the monovinylidene monomer can be replaced with methyl methacrylate.

The method used to prepare the nitrile polymers may be any which is commonly practiced in the art; the polymerization may be effected en masse, in solution or with the monomer in an aqueous dispersion as an emulsion or suspension.

Optionally, the high nitrile polymers used to prepare the exterior lenses of the present invention may contain from 0 to 30 percent by weight of a synthetic or natural rubber component such as polybutadiene, isoprene, neoprene, nitrile rubbers, acrylate rubbers, natural rubbers, acrylonitrilebutadiene copolymers, ethylene-propylene copolymers, chlorinated rubbers, etc., which is used to strengthen or toughen the high nitrile lenses. This rubbery component may be incorporated into the high nitrile polymeric material by any of the methods which are well known to those skilled in the art, e.g., direct polymerization of monomers, grafting the monomers onto the rubbery backbone, polyblending a rubber graft polymer with a matrix polymer, etc.

The refractive index of the rubber component should match the refractive index of the nitrile polymer in order to obtain good optical properties in the resulting lenses. The practice of matching the rubber and matrix indices is well known in the art and needs no further explanation here.

The preferred rubber component used in the exterior lenses of the present invention are the two stage grafted rubbers which are taught in U.S. Pat. No. 3,671,607 to Lee et al., which is incorporated herein by reference. Especially preferred rubber components are prepared from butadiene-styrene rubbers having a butadiene content of from 68 to 72 percent by weight, a refractive index in the range of from 1.5375 to 1.5425, a particle size in the range of from 0.06 to 0.2 microns before grafting, a gel content in the range of from 40 to 95 percent, a swelling index in the range of from 10 to 40, and a second order transition temperature (Tg) less than −20°C. and preferably less than −40°C. as determined by ASTM Test D-746-52T. These especially preferred rubbers are grafted in two stages using a first and second polymerizable monomer composition.

The first polymerizable monomer composition comprises (1) from 0.1 to 2 percent by weight, preferably 0.1 to 1 percent by weight, of a non-conjugated diolefin monomer, (2) from 0 to 30 percent by weight of an ethylenically unsaturated nitrile selected from the group consisting of acrylonitrile, and mixtures of acrylonitrile and methacrylonitrile which contain up to 20 percent by weight of methacrylonitrile, (3) from 40 to 60 percent by weight of a vinylidene aromatic hydrocarbon monomer and (4) from 20 to 50 percent by weight of an alkyl ester of acrylic or methacrylic acid wherein the alkyl group contains from 1 to 8 carbon atoms, wherein the percent by weight referred to above is based on the total weight of the first polymerizable monomer mixture.

The nonconjugated diolefins employed in the practice of this invention are monomers which have two nonconjugated ethylenically unsaturated double bonds per molecule, such that at least one double bond reacts readily causing the diolefin to interpolymerize with the other monomers used in the first polymerizable monomer formulation. Preferably, these diolefins have two ethylenically unsaturated double bonds with a different degree of reactivity or having a crosslinking efficiency of less than one. These diolefins may be aliphatic, aromatic, aliphatic-aromatic, heterocyclic, cycloaliphatic, etc. Examples of suitable diolefins would include divinyl benzene, ethylene dimethacrylate, ethylene glycol dimethacrylate, triethylene glycol dimethylacrylate, tetraethylene glycol dimethacrylate, polyethylene glycol dimethacrylate, allyl methacrylate, diallyl fumarate, diallyl maleate, vinyl crotonate, and nonconjugated alpha, omega diolefins of at least 5 carbon atoms such as 1,4-pentadiene, 1,7-octadiene, etc. Ethylene glycol dimethacrylate is the preferred difunctional monomer.

The monovinylidene aromatic hydrocarbons which are used in the superstrate are the same as those discussed above with styrene and alpha-methylstyrene being preferred.

The alkyl esters of acrylic and methacrylic acids used in the first polymerizable monomer composition are those wherein the alkyl group contains from 1 to 8 carbon atoms, e.g., methyl, ethyl, propyl, butyl, 2-ethylhexyl, etc. Examples of such esters include methyl acrylate, ethyl acrylate, butyl acrylate, methyl methacrylate, butyl methacrylate, 2-ethyl hexylmethacrylate, etc. The preferred ester is methyl methacrylate. A particularly preferred first polymerizable monomer composition contains (1) 0.1 to 2 percent by weight of ethylene glycol dimethacrylate; (2) 20 to 30 percent by weight of acrylonitrile; (3) 40 to 60 percent by weight of styrene; and (4) 20 to 50 percent by weight of methyl methacrylate; wherein the percent by weight referred to above is based on the total weight of the first polymerizable monomer mixture.

The second polymerizable monomer composition contains from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile.

The second polymerizable monomer composition contains from 15 to 45 percent by weight of a monovinylidene aromatic hydrocarbon monomer of the type referred to above. Up to 10 percent of the monovinylidene aromatic hydrocarbon monomer can be replaced with a vinylidene monomer selected from the group consisting of alkyl vinyl ethers wherein the alkyl group contains from 1 to 4 carbon atoms, vinyl esters such as vinyl acetate and alkyl esters of acrylic and methacrylic acids wherein the alkyl groups contain from 1 to 8 carbon atoms.

The preferred monovinylidene aromatic hydrocarbons used in the second monomer composition are styrene and alpha-methylstyrene. The preferred vinylidene monomers, which are used to replace up to 10 percent by weight of the monovinylidene aromatic hydrocarbon, include methyl vinyl ether, ethyl vinyl ether, methyl acrylate, ethyl acrylate, butyl acrylate and the corresponding methacrylates, especially methyl methacrylates.

The grafted superstrate contains a total of at least 40 percent by weight ethylenically unsaturated nitrile monomer and the ratio of grafted superstrate to substrate is in the range of from 15–200:100.

The percent by weight referred to above in regard to the second monomer composition is based on the total weight of the monomers in the second monomer composition. The above specified refractive index range for the especially preferred butadiene styrene rubber substrate is required in order to have the refractive index of the rubber substrate in the same range as the refractive indices for the grafted superstrates and the high nitrile matrix in order to provide optimum optical properties. The above specified rubber particle size, gel contect, swelling index and second order transition temperature is required in order to provide optimum impact properties.

Preferably, the two stage grafted rubbers described above are blended with a matrix polymer which contains from 55 to 85 percent, preferably 60 to 70 percent by weight, based on the total weight of the polymer, of an ethylenically unsaturated nitrile monomer selected from the group consisting of acrylonitrile and mixtures of acrylonitrile and methacrylonitrile which contain up to 20 percent by weight of methacrylonitrile based on the total weight of acrylonitrile and methacrylonitrile and from 15 to 45 percent of a monovinylidene aromatic hydrocarbon monomer of the type referred to above. Up to 10 percent of the monovinylidene aromatic hydrocarbon monomer can be replaced with a vinylidene monomer as outlined above.

Preferably, the composition of the matrix polymer is substantially the same as the composition of the second polymerizable monomer composition. Moreover, the refractive indices for the grafter rubber and the matrix should be closely matched in order to provide maximum optical properties.

The following examples are set forth in illustration of the present invention and are not to be construed as a limitation thereof. Unless otherwise indicated all parts and percentages are by weight.

EXAMPLES 1 to 3

In Examples 1 to 3 test specimens are molded from (1) a typical commercially available polymethylmethacrylate (PMMA) polymer; (2) a typical styrene-acrylonitrile (SAN) suspension made copolymer containing 74 percent and 26 percent acrylonitrile; and (3) an acrylonitrile-styrene (AN/S) suspension made copolymer containing 63 percent acrylonitrile and 37 percent styrene which represents the preferred copolymers used to prepare the exterior lenses of the present invention.

The test specimens are prepared by conventional injection molding techniques using a stock temperature of 450°F. and an injection pressure of 1,200–1,400 psi. The physical and optical properties of the molded test specimens are evaluated and the results are listed in Table I below:

TABLE I

SUMMARY OF TEST RESULTS FOR SAMPLES 1 – 3

| Property | PMMA | S/AN 74/26 | AN/S 63/27 | Test Method |
|---|---|---|---|---|
| Izod impact strength ft. lbs./in | 0.4 | 0.4 | 0.6 | ASTM D-256 |
| Tensile strength at yield, PSI | 9,700 | 9,800 | 11,700 | ASTM D-638 |
| Elongation at fail, % | 4 | 3 | 25 | ASTM D-638 |
| Tensile Modulus, PSI × $10^{-5}$ | 4.5 | 5.0 | 6.0 | ASTM D-638 |
| Flexural strength, PSI | 16,700 | 17,000 | 19,500 | ASTM D-790 |
| Flexural Modulus, PSI × $10^{-5}$ | 4.9 | 5.2 | 6.1 | ASTM D-790 |
| Rockwell Hardness R | 121 | — | 124 | ASTM D-785 |
| M | 100 | 89 | 98 | |
| Heat Dist. Temp., °F. at 264 PSI | 203 | 198 | 212 | ASTM D-648 |
| Taber Scratch Resistance, gms. | 86 | 44 | 60 | |
| Haze, % at 420 μ | 1.0 | 2.0 | 2.0 | ASTM D-1003 |
| Δ z-y yellowness after 1000 hr. UVA exposure | 5 | 25 | 0 | |
| Refractive index | 1.489 | 1.569 | 1.544 | |

The above data indicate that, except for Taber Scratch resistance and haze, the samples molded from the AN/S (63/27) copolymer are superior to those samples molded from the PMMA conventionally used to make exterior automotive lenses. Moreover, the scratch resistance and haze level of the AN/S (63/27) copolymer of the present invention is within acceptable limits. The AN/S (63/27) copolymer is generally superior to the SAN (74/26) polymer tested.

EXAMPLE 4

This example illustrates a two stage graft polymerization reaction to prepare a rubber modified polymer which is then used to prepare exterior lenses according to the present invention.

A butadiene-styrene (70 percent butadiene-30 percent styrene) latex, which is further characterized as follows:

| | |
|---|---|
| Solids | ~ 40 percent by weight |
| pH | 8.5–8.8 |
| Surface tension | 68–72 dynes/cm |
| Average particle size | 0.09 to 0.1 micron |
| Gel content | 89 percent to 93 percent |
| Swelling index | 12 – 16 |
| Refractive index $n_d^{25}$ | 1.5375 – 1.5395 |
| Tg | < –40°C. | is diluted to 20 percent rubber solids. One percent of sodium lauryl sulfate is added to the latex which is charged to a reactor and heated under nitrogen and with agitation to about 60°C. An aqueous solution of 1.0 parts of sodium formaldehyde sulfoxylate and a small quantity of chelated iron is added before graft monomer addition. To this latex is continuously added over a one hour period a first monomer composition of 100 parts acrylonitrile, 200 parts styrene, 100 parts methyl methacrylate and 4 parts ethylene glycol dimethacrylate. During monomer addition, 1 part of potassium persulfate in aqueous solution is charged to the reactor. Stirring is continued during the addition of the first monomer composition and is continued for an additional period of one hour thereafter. Then, 0.8 part of sodium formaldehyde sulfoxylate and 0.8 part of potassium persulfate in aqueous solution is added to the latex and a second monomer composition of 130 parts acrylonitrile, 70 parts styrene and 2 parts tert-dodecyl mercaptan is continuously added to the reactor over a one-half hour period. Towards the end of the second monomer composition addition, a solution of 11 parts sodium lauryl sulfate is charged to the reactor, and agitation and heating are continued for about 30 minutes. The latex is then cooled to 25°C. and 5 parts of a conventional antioxidant is added to the batch. The latex is then coagulated in a hot aqueous magnesium sulfate solution, the coagulum is filtered, washed with water and dried.

The graft copolymer prepared above is blended with a matrix copolymer of 63 percent by weight acrylonitrile and 37 percent by weight styrene previously prepared by conventional suspension polymerization to provide blends with variations in the amount of rubber in the polyblend. The matrix copolymer has a specific viscosity (0.1 g/100 ml DMF) of 0.078 and a yellowness index of 35.5 and 1.5 percent haze.

The graft and matrix polymers are compounded by extrusion and test specimens are molded on a reciprocating screw injection molding machine at 200°C. barrel temperature.

Optical and impact properties are determined as outlined above. The properties of the test specimens are listed in Table II below.

EXAMPLE 5 (CONTROL)

For comparison a graft copolymer is prepared by a one step grafting procedure wherein the grafted superstrate is of substantially uniform composition throughout. In this test, the procedure of Example 4 is substantially repeated. However, to the 2,500 parts of rubber latex, a mixture of 390 parts acrylonitrile, 210 parts styrene and 6 parts tert.-dodecyl mercaptan is added continuously over a 90 minute period. The total amount of reducing agent and of persulfate used is the same as in Example 4. The latex is stirred at 60°C. for one hour after monomer addition and the graft copolymer is recovered, processed and molded as in Example 4. The properties of the test specimens are listed in Table II below.

EXAMPLE 6 (CONTROL)

For comparison purposes a conventional commercially available ABS graft copolymer, having an acrylonitrile content of about 25 percent by weight, is obtained and tested. The properties of the test specimens are listed in Table II below.

TABLE II

| PROPERTIES OF POLYBLENDS | | | | | |
|---|---|---|---|---|---|
| | Example 4 Two Stage Graft | | Example 5 (Control) Single Stage Graft | | Example 6 Control Conventional ABS Graft |
| Percent graft copolymer in blend | 0 | 26 | 33 | 26 | 33 |
| | | | | 33 | |
| Percent rubber in blend | 0 | 10 | 15 | 10 | 15 |
| | | | | 15 | |
| Refractive index | | 1.544 | | 1.544 | — |
| Izod impact Strength (ft.-lbs./in) | 0.6 | 2.3 | 5.8 | 1.8 | 3.7 |
| | | | | | 4.5 |
| Percent haze | 1.6 | 2.1 | 2.3 | 15.8 | 20.1 |
| | | | | | opaque |

As can be seen from the results in Table II, the molded specimens prepared using graft copolymers prepared in a two stage grafting step provide significantly improved properties both in transparency, as shown by relatively low haze, color and in impact resistance.

EXAMPLE 7

This example illustrates the good processability and shorter molding cycles that are possible when manufacturing high nitrile lenses according to the teachings of the present invention. The nitrile polymer used is a copolymer of 63% by weight of acrylonitrile and 37% by weight of styrene (AN/S 63/37). This material is compared to a conventional PMMA material. The apparent viscosity and spiral flow of these materials was measured and found to be as follows:

| | | | PMMA | AN/S |
|---|---|---|---|---|
| Apparent Viscosity, Capillary Rheometer (K poise, 450°F.) | | | | |
| | 100 | sec$^{-1}$ | 12.8 | 22.0 |
| | 1000 | sec$^{-1}$ | 3.1 | 4.7 |
| Spiral Flow (cm) | | 450°F. | 18 | 10 |
| | | 500°F. | 42 | 23 |

The AN/S and PMMA lens material referred to above are molded using several different molds in a Natco 450 ton injection molding machine. Molding conditions for the PMMA material are those currently used in commercial production. The conditions for the AN/S copolymer are chosen to give a minimum cycle consistent with good part quality. The molding conditions used are set forth below in Table III.

TABLE III

| SUMMARY OF NATCO MOLDING CONDITIONS | | |
|---|---|---|
| | PMMA | AN/S |
| Barrel Temperature °F. (Front to Rear) | 450/485/490 | 400 → 400 |
| Nozzle Temperature °F. | 490 | 430 |
| Injection Pressure - psi | 1200 | 1500 |
| Hold Pressure - psi | 1000 | 1200 |
| Screw Back Pressure - psi | 200 | 200 |
| Ram Bottoming Time - Seconds | 4 | 4 |
| Inject High Pressure - Seconds | 6 | 6 |
| Ram Forward Time - Seconds | 12 | 12 |
| Clamp Closed - Time - Seconds | 50 | 25 |
| Stock Temperature °F. | 520 | 470 |
| Mold Temperature °F. | 120 | 120 |

Note in the above Table, the lower melt temperatures that can be used with the acrylonitrile-styrene copolymer. Also note that the Clamp Closed Time is only 25 seconds for the acrylonitrile-styrene copolymers as opposed to 50 seconds for the PMMA. The lower melt temperatures allow shorter clamping times thereby providing shorter molding cycles when using the acrylonitrile polymer.

EXAMPLE 8

Further tests are carried out to show the faster mold set-up times which are obtained when using the nitrile polymers of the present invention. The polymers used in this example, which are tail light medium red in color, are the same as those used in Example 7 above.

The polymers are molded into ½ × ½ × 5 inches test specimens using various cycle times on an Arburg ERIII injection molding machine. The molding conditions used are set forth in Table IV below:

TABLE IV

| SUMMARY OF ARBURG MOLDING CONDITIONS | | |
|---|---|---|
| | PMMA | AN/S |
| Barrel Temperature °F. | 450/450/450 | 425/425/425 |
| Nozzle Set | 48 | 48 |
| Injection Rate | Max. | Max. |
| Mold Temperature °F. | 110 | 110 |
| Inj./Hold Pressure - psi | 1200/500 | 1200/500 |
| Stock Temperature °F. | 460–470 | 440–450 |
| Injection Rate - Seconds | 1.5 | 1.5 |
| Injection Hold - Seconds | 10 | 10 |
| Hold Time Total - Seconds | 30 to 60 | 30 to 60 |

Immediately after ejection from the mold, the test specimens (10 samples for each molding time) are suspended by their ends between 2 metal bars 1 inch high which are spaced 4¾ inches apart. The test specimens are allowed to cool for at least 30 minutes and then the deflection or sag of the test specimens between the metal bars is measured.

The deflection or sag results for the test specimens are summarized in Table V below:

TABLE V

| SUMMARY OF DEFLECTION TESTS | | |
|---|---|---|
| Total Mold Holding Time Seconds | Average Bar Deflection (Mils) | |
| | PMMA | AN/S |
| 25 | 328 | 381 |
| 30 | 262 | 251 |

TABLE V-continued
SUMMARY OF DEFLECTION TESTS

| Total Mold Holding Time Seconds | Average Bar Deflection (Mils) PMMA | AN/S |
|---|---|---|
| 35 | 217 | 244 |
| 40 | 171 | 154 |
| 45 | 154 | 98 |
| 50 | 109 | 43 |
| 60 | 55 | 19 |

The above data indicate that the mold holding time for the acrylonitrile-styrene copolymer is considerably shorter for equal bar deflection. In other words, after 60 seconds mold holding time the PMMA material shows a deflection of 60 mils versus 30 mils for the acrylonitrile polymer. This is further indication of the shorter mold time and faster molding cycles that are possible when using the high nitrile polymers of the present invention.

EXAMPLE 9

The polymers used in Example 7 above are used to mold rectangular red tail light lenses, which are about 1 3/4 by 4 by 1 5/8 inches. The lenses are stabilized with a conventional benzotriazole U.V. light stabilizer.

The lenses are then subject to 6 months (April to October) exposure tests in Florida. The lenses prepared from the acrylonitrilestyrene copolymer are examined visually and found to show practically no surface deterioration. The PMMA lenses show a slight loss in surface gloss.

Visual observation of other lenses, which were painted, show that the high nitrile lenses of the present invention are far more resistant to the solvents used in paints and lacquers than are the PMMA lenses of the prior art. This solvent resistance provide another advantage in the event that the lenses come in contact with organic solvents, gasoline, cleaning agents, etc.

Also contemplated for use in the lenses of the present invention are dyes, pigments, antioxidants, U.V. stabilizers, fillers, plasticizers, etc.

It should be apparent from the foregoing that many variations in the size, shape and color of the lenses are possible within the scope of the present invention.

What is claimed is:

1. A method for covering the light source in exterior lamps in vehicles which method comprises covering the lamp with a lens which is the polymerization product of (1) from 55 to 85 percent by weight of an ethylenically unsaturated nitrile monomer selected from the group consisting of acrylonitrile and mixtures of acrylonitrile and methacrylonitrile which contain up to 20 percent by weight of methacrylonitrile based on the total weight of acrylonitrile and methacrylonitrile; and (2) from 15 to 45 percent by weight of a monovinylidene aromatic hydrocarbon monomer which is copolymerizable with the nitrile monomer; and which further contains a rubber component having a refractive index which is substantially the same as the refractive index of the acrylonitrile polymer, wherein the rubber component comprises:

A. A butadiene-styrene rubbery substrate having a butadiene content of 68 to 72 percent by weight and a styrene content of 28 to 32 percent by weight based on the total weight of the butadiene-styrene rubbery substrate which rubbery substrate is further characterized as having a refractive index in the range of from 1.5375 to 1.5475, a particle size in the range of from 0.06 to 0.2 micron, a gel content in the range of from 40 to 95 percent, a swelling index in the range of from 10 to 40, and a second order transition temperature (Tg) less than $-40°C$.; and B. a superstrate grafted onto the rubbery substrate which superstrate comprises:
1. the polymerization product of a first polymerizable monomer composition comprising:
    a. from 0.1 to 2 percent by weight of a nonconjugated diolefin monomer;
    b. from 0 to 30 percent by weight of an ethylenically unsaturated nitrile monomer selected from the group consisting of acrylonitrile, and mixtures of acrylonitrile and methacrylonitrile which contain up to 20 percent by weight of methacrylonitrile;
    c. from 40 to 60 percent by weight of a vinylidene aromatic hydrocarbon monomer; and
    d. from 20 to 50 percent by weight of an alkyl ester of acrylic or methacrylic acid wherein the alkyl group contains from 1 to 8 carbon atoms, wherein the percent by weight is based on the total weight of the monomer in the first polymerizable monomer mixture; and
2. a second polymerizable monomer composition comprising from 55 to 85 percent by weight of an ethylenically unsaturated nitrile monomer selected from the group consisting of acrylonitrile and mixtures of acrylonitrile and methacrylonitrile which contains up to 20 percent by weight of methacrylonitrile based on the total weight of acrylonitrile and methacrylonitrile and from 15 to 45 percent by weight of a monovinylidene aromatic hydrocarbon monomer wherein the percent by weight is based on the total weight of the monomers in the second polymerizable monomer mixture;

wherein the grafted superstrate contains a total of at least 40 percent by weight ethylenically unsaturated nitrile monomer and wherein the ratio of grafted superstrate to substrate is in the range of from 15–200:100, wherein the amount of rubber in the polymerization product calculated on the weight of the rubber prior to grafting, is in the range of from 10 to 30 percent by weight.

2. A method as in claim 1 wherein the nitrile monomer is acrylonitrile.

3. A method as in claim 1 wherein the aromatic hydrocarbon monomer is styrene.

4. A method as in claim 2 wherein the amount of acrylonitrile monomer in the polymer is in the range of from 60 to 70 percent by weight.

5. A method as in claim 1 wherein the polymerization product contains up to 10 percent of a termonomer.

6. A method as in claim 1 wherein the vinylidene aromatic hydrocarbon monomer is replaced by methyl methacrylate.

7. An exterior lamp for a vehicle comprising in combination, a light source, a housing for the light source and a lens to cover the light source wherein the lens comprises the polymerization product of (1) from 55 to 85 percent by weight of an ethylenically unsaturated nitrile monomer selected from the group consisting of acrylonitrile and mixtures of acrylonitrile and methacrylonitrile based on the total weight of acrylonitrile and methacrylonitrile; and (2) from 15 to 45 percent by weight of a monovinylidene aromatic hydrocarbon monomer which is copolymerizable with the nitrile monomer; and which further contains a rubber component wherein the rubber component comprises:

A. a butadiene-styrene rubbery substrate having a butadiene content of 68 to 72 percent by weight and a styrene content of 28 to 32 percent by weight based on the total weight of the butadiene-styrene rubbery substrate which rubbery substrate is further characterized as having a refractive index in the range of from 1.5375 to 1.5475, a particle size in the range of from 0.06 to 0.2 micron, a gel content in the range of from 40 to 95 percent, a swelling index in the range of from 10 to 40, and a second order transition temperature (Tg) less than −40°C.; and B. a superstrate grafted onto the rubbery substrate which superstrate comprises:
1. the polymerization product of a first polymerizable monomer composition comprising:
    a. from 0.1 to 2 percent by weight of a nonconjugated diolefin monomer;
    b. from 0 to 30 percent by weight of an ethylenically unsaturated nitrile monomer selected from the group consisting of acrylonitrile, and mixtures of acrylonitrile and methacrylonitrile which contain up to 20 percent by weight of methacrylonitrile;
    c. from 40 to 60 percent by weight of a vinylidene aromatic hydrocarbon monomer; and
    d. from 20 to 50 percent by weight of an alkyl ester of acrylic or methacrylic acid wherein the alkyl group contains from 1 to 8 carbon atoms, wherein the percent by weight is based on the total weight of the monomer in the first polymerizable monomer mixture; and
2. a second polymerizable monomer composition comprising from 55 to 85 percent by weight of an ethylenically unsaturated nitrile monomer selected from the group consisting of acrylonitrile and mixtures of acrylonitrile and methacrylonitrile which contain up to 20 percent by weight of a methacrylonitrile based on the total weight of acrylonitrile and methacrylonitrile and from 15 to 45 percent by weight of a monovinylidene aromatic hydrocarbon monomer wherein the percent by weight is based on the total weight of the monomers in the second polymerizable monomer mixture;

wherein the grafted superstrate contains a total of at least 40 percent by weight ethylenically unsaturated nitrile monomer and wherein the ratio of grafted superstrate to substrate is in the range of from 15–200:100; wherein the amount of rubber in the polymerization product calculated on the weight of the rubber prior to grafting, is in the range of from 10 to 30 percent by weight.

8. An exterior lamp for a vehicle in claim 7 wherein the nitrile monomer is acrylonitrile.

9. An exterior lamp for a vehicle as in claim 7 wherein the aromatic hydrocarbon monomer is styrene.

10. An exterior lamp for a vehicle as in claim 8 wherein the amount of acrylonitrile monomer in the polymer is in the range of from 60 to 70 percent by weight.

11. An exterior lamp for a vehicle as in claim 7 wherein the polymerization product contains up to 10 percent of a termonomer.

12. An exterior lamp for a vehicle as in claim 7 wherein the vinylidene aromatic hydrocarbon monomer is replaced by methyl methacrylate.

* * * * *